(12) United States Patent
Nishi et al.

(10) Patent No.: US 6,604,551 B2
(45) Date of Patent: Aug. 12, 2003

(54) FUEL HOSE

(75) Inventors: Eiichi Nishi, Kanagawa (JP); Masako Nagashima, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/107,491

(22) Filed: Mar. 28, 2002

(65) Prior Publication Data

US 2002/0134449 A1 Sep. 26, 2002

Related U.S. Application Data

(63) Continuation of application No. PCT/JP00/06724, filed on Sep. 28, 2000.

(30) Foreign Application Priority Data

Sep. 30, 1999 (JP) .............................. 11-277822

(51) Int. Cl.⁷ ................................. F16L 11/00
(52) U.S. Cl. .................. 138/137; 138/141; 138/121; 428/36.91
(58) Field of Search ................. 138/121, 137, 138/141; 428/36.91

(56) References Cited

U.S. PATENT DOCUMENTS

| | | | | |
|---|---|---|---|---|
| 3,561,493 A | * | 2/1971 | Maillard ..................... | 138/141 |
| 5,284,184 A | * | 2/1994 | Noone et al. ................ | 138/121 |
| 5,305,799 A | * | 4/1994 | Dal Palu .................... | 138/121 |
| 5,524,673 A | * | 6/1996 | Noone et al. ................ | 138/137 |
| 5,622,210 A | * | 4/1997 | Crisman et al. ............. | 138/137 |
| 5,718,957 A | * | 2/1998 | Yokoe et al. ............. | 428/36.91 |
| 5,884,671 A | * | 3/1999 | Noone et al. ................ | 138/137 |
| 5,934,336 A | * | 8/1999 | Hsich ......................... | 138/137 |
| 5,937,911 A | * | 8/1999 | Kodama et al. ............. | 138/137 |
| 5,996,642 A | * | 12/1999 | Noone et al. ................ | 138/137 |
| 6,010,592 A | * | 1/2000 | Jameson et al. ......... | 156/379.6 |
| 6,165,575 A | * | 12/2000 | Nishi et al. ................ | 428/36.9 |
| 6,197,904 B1 | * | 3/2001 | Gangal et al. ............. | 526/247 |
| 6,225,399 B1 | * | 5/2001 | Araki et al. ................ | 524/544 |
| 6,257,281 B1 | * | 7/2001 | Nie et al. ................... | 138/137 |

FOREIGN PATENT DOCUMENTS

| | | |
|---|---|---|
| EP | 0 957 148 | 11/1999 |
| EP | 1 217 278 | 6/2002 |
| JP | 7-18026 | 1/1995 |
| JP | 7-205328 | 8/1995 |
| JP | 8-104806 | 4/1996 |
| JP | 10-259216 | 9/1998 |
| JP | 10-311461 | 11/1998 |
| JP | 11-115995 | 4/1999 |

* cited by examiner

*Primary Examiner*—James Hook
(74) *Attorney, Agent, or Firm*—Oblon, Spivak, McClelland, Maier & Neustadt, P.C.

(57) ABSTRACT

A fuel hose wherein an electrically conductive fluororesin is used as an inner layer, and the inside surface thereof is smooth even when it is molded at a high speed, is provided. As the inner layer, a highly melt flowable fluororesin having an electrical conductivity and a melt flow rate of from 14 to 30 (g/10 min), is used to form a fuel hose wherein the inside surface of the inner layer is substantially smooth.

24 Claims, 1 Drawing Sheet

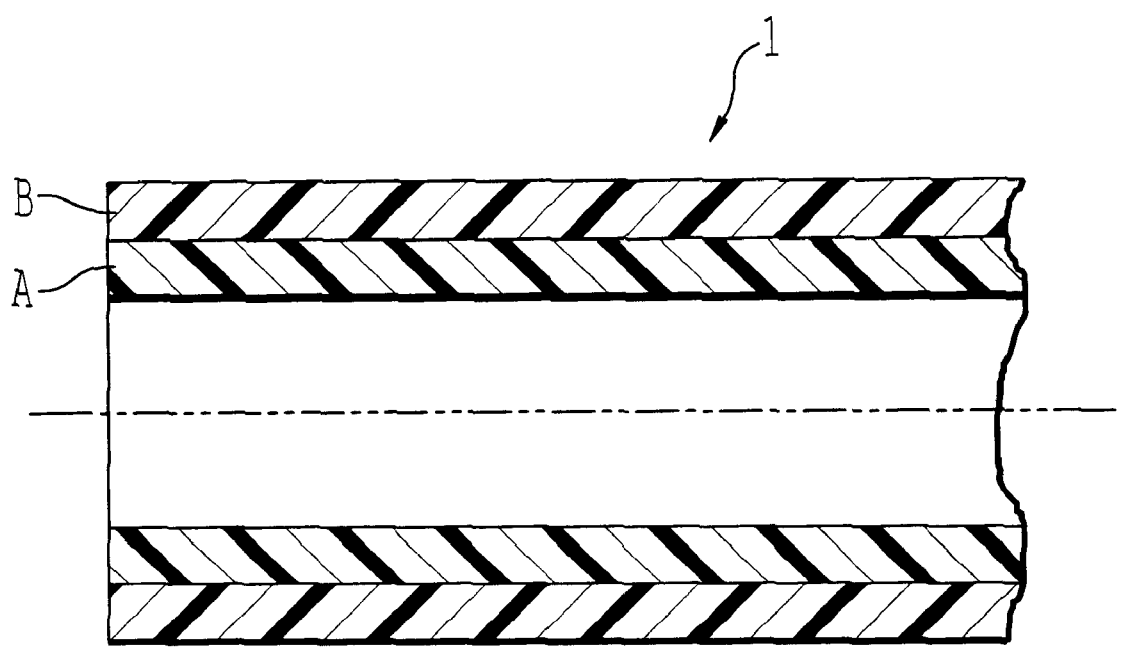

FUEL HOSE

This application is a Continuation of International Application No. PCT/JP00/06724 Filed on Sep. 28, 2000.

FIELD OF THE INVENTION

The present invention relates to a fuel hose wherein a highly flowable electrically conductive fluororesin layer is used as an inner layer, and the inside surface thereof is substantially smooth even when it is molded at a high speed.

DESCRIPTION OF THE INVENTION

Heretofore, a fluororesin is used in a wide range of fields, since it is excellent in e.g. heat resistance, chemical resistance, weather resistance, non-tackiness, low frictional nature and low dielectric property. For example, use as a surface covering material to cover a substrate is known wherein a film or the like of a fluororesin is laminated on the surface of a substrate made of an inorganic material such as a metal or glass or an organic material such as a synthetic resin. Further, as an important application to a laminate, a fuel hose may be mentioned which is used in an engine room of an automobile and which is exposed to a severe condition such as a high temperature environment.

The fuel hose is a hose for piping, wherein a gasoline fuel containing an alcohol or an aromatic compound is transported. In recent years, regulations relating to permeation of gasoline have become severer, and as a measure to cope with such requirements, a hose of a multilayer structure such as a two layer structure, has been proposed, and especially for the inner layer which is directly in contact with the fuel, it is desired to use a resin having chemical resistance against a corrosive material such as ethanol or methanol present in the fuel and a gas barrier property not to let such a material permeate. From such a viewpoint, a fluororesin having heat resistance, chemical resistance and gas barrier property, is considered to be one of the most preferred materials, as the material for the inner layer.

However, the fluororesin forming the inner layer has a high insulation property, whereby static electricity is likely to form and electrification is likely to result when a fuel passes in the hose. Accordingly, leakage of the fuel due to formation of a hole in the hose, and problems due to electric discharge, are likely to result. Therefore, it is necessary to prevent electrification of the fluororesin, for example, by imparting electrical conductivity to release the formed static electricity.

On the other hand, for the outer layer of a fuel hose, it is common to use a polyamide resin such as polyamide 6, polyamide 11 or polyamide 12, which has relatively good durability.

The present inventors have disclosed in JP-A-10-311461 a fuel hose wherein an outer layer is made of a polyamide thermoplastic resin having an amino group-containing compound, and an inner layer is made of a fluororesin, and wherein the outer layer and the inner layer are bonded with high strength by means of a fluorinated adhesive resin.

At present, in the field of fuel hoses, for the purpose of mass production, it is required to carry out molding at a withdrawing speed for the production of a hose as high as possible, for example, at a withdrawing speed of at least 15 m/min. According to a study by the present inventors, it is considerably difficult to satisfy such a requirement in the case of a hose wherein the outer layer is made of a thermoplastic resin other than a fluororesin, and an inner layer is made of an electrically conductive fluororesin.

Namely, the thermoplastic resin of the outer layer is basically highly melt flowable and can satisfy the requirement, but the problem is the electrically conductive fluororesin of the inner layer, and it is not easy to satisfy the requirement. Namely, the fluororesin is basically a low melt flowable resin, and when an electrical conductivity-imparting filler such as carbon black is incorporated thereto in order to impart an antistatic function, the melt flowability will further be lowered. If high speed molding of a hose is carried out at a withdrawing speed of the above-mentioned high speed, melt fracture (so-called melfra) will form, whereby the inside surface of the form will be roughened, and the appearance will be poor, whereby there has been a problem that the commercial value decreases substantially.

Further, a fuel hose is basically subjected to bending at various angles over the entire length of a straight tube produced by extrusion molding, in order to adapt it to configurational or spacial restrictions in a specific structure of each automobile. The bending of the hose not only increases a process step, but wrinkles may thereby be formed. Once wrinkles are formed, the stress will be concentrated at such a portion, whereby there will be a problem that the useful life of the hose tends to be substantially short.

SUMMARY OF THE INVENTION

It is an object of the present invention to solve the above-mentioned problems and to provide a fuel hose comprising an outer layer made of a thermoplastic resin and an inner layer made of a fluororesin having electrical conductivity, and which is excellent in the adhesive strength between the inner and outer layers, wherein the surface smoothness is secured even by molding at a high speed. Further, it is intended to provide preferably a fuel hose which can be mounted on an automobile without necessity of bending processing.

BRIEF DESCRIPTION OF THE DRAWINGS

FIG. 1 shows a fuel hose according to the present invention.

DETAILED DESCRIPTION OF THE PREFERRED EMBODIMENTS

The present invention has been made to solve the above problems, and according to the present invention, the following invention will be presented.

(1) As shown in FIG. 1, a fuel hose 1 having a laminated structure comprising an inner layer (A) made of a fluororesin and an outer layer (B) made of a thermoplastic resin other than a fluororesin, wherein the inner layer (A) has electrical conductivity and a melt flowability such that the melt flow rate is from 14 to 30 (g/10 min), and at least the inside surface of the inner layer is substantially smooth.

Further, according to the present invention, in the above fuel hose, a fuel hose having a corrugated region at a midpoint thereof, is presented.

BEST MODE FOR CARRYING OUT THE INVENTION

Now, the present invention will be described in detail with reference to the preferred embodiments The present invention provides a fuel hose having a laminated structure comprising an inner layer (A) made of a fluororesin and an outer layer (B) made of a thermoplastic resin other than a fluororesin. As the thermoplastic resin other than a fluororesin to be used as the outer layer (B), various thermoplastic resins can be used.

It may, for example, be a polyolefin such as polyethylene or polypropylene; a polyamide such as polyamide 6, polyamide 66, polyamide 610, polyamide 612, polyamide 11 or polyamide 12; a polyester such as polyethylene terephthalate or polybutylene terephthalate; a (meth)acrylic resin such as polymethyl acrylate or polymethyl methacrylate; polystyrene, an ABS resin, an AS resin, polyimide, polyamide imide, polyphenylene sulfide, polyvinyl butyral, polyvinylidene chloride, polyacetal or a vinyl chloride resin. Further, it may be an elastomer such as a polyolefin type thermoplastic elastomer, a polyamide type thermoplastic elastomer, a polyester type thermoplastic elastomer, a polybutadiene type thermoplastic elastomer or a polystyrene type thermoplastic elastomer.

These resins may be used alone or as blended.

Particularly preferred is a polyamide excellent in flexibility and low temperature impact resistance. Especially, polyamide 6, polyamide 11 or polyamide 12 is preferred.

As the fluororesin to be used as the inner layer (A) in the present invention, basically, any known fluororesin may be used. However, an ethylene/tetrafluoroethylene copolymer, polytetrafluoroethylene or a tetrafluoroethylene/hexafluoropropylene copolymer is preferred, and an ethylene/tetrafluoroethylene copolymer (hereinafter referred to as ETFE) is most preferred.

ETFE may preferably be one having tetrafluoroethylene and ethylene copolymerized in a ratio of from 70/30 to 30/70 (molar ratio) or one having such monomers copolymerized with at least another copolymerizable monomer other than ethylene, such as a fluoroolefin or propylene. A more preferred copolymer is one having tetrafluoroethylene/ethylene/other monomer copolymerized in a molar ratio of (60–30)/(20–60)/(0–40), particularly preferably (60–40)/(35–60)/(0–5).

Such a copolymerizable monomer may, for example, be an α-olefin such as propylene or butene; a fluoroolefin having an unsaturated group and hydrogen atoms, such as vinyl fluoride, vinylidene fluoride or (perfluorobutyl) ethylene; a vinyl ether such as an alkyl vinyl ether or a (fluoroalkyl) vinyl ether; or a (meth)acrylate such as a (fluoroalkyl) acrylate or a (fluoroalkyl) methacrylate. Further, a monomer having no hydrogen atoms in an unsaturated group, such as hexafluoropropylene or a perfluoro (alkyl vinyl ether) may be used in combination. As described in the foregoing, in the present invention, ETFE is used to mean an ethylene/tetrafluoroethylene copolymer including a copolymer with such a copolymerizable monomer. ETFE can be produced by various known polymerization methods such as bulk polymerization, suspension polymerization, emulsion polymerization and solution polymerization.

In the present invention, the inner layer (A) made of the above fluororesin has a feature that it has electrical conductivity and a melt flowability such that the melt flow rate (hereinafter referred to as MFR) is from 14 to 30 (g/10 min).

With respect to the electrical conductivity, the volume resistivity is preferably from 1 to $10^9$ (Ω·cm) with a view to providing an antistatic function effectively.

The electrical conductivity may be imparted by incorporating an electrical conductivity-imparting filler to the inner layer. The electrical conductivity-imparting filler may, for example, be a powder of metal such as copper, nickel or silver; a fiber of metal such as iron or stainless steel; carbon black, or a metal inorganic compound having the surface of e.g. zink oxide, glass beads or titanium oxide coated by metal sputtering or electroless plating. Among them, carbon black is most preferred, since hydroxyl groups or carboxyl groups are present on the particle surface, and such groups also serve as adhesive groups to improve the adhesiveness of the inner layer.

The blending amount of the electrical conductivity-imparting filler may suitably be determined depending upon the type of the filler, the type of the fluororesin, the designed conductive performance of the hose, the molding conditions, etc., but it is usually from 1 to 30 parts by mass, particularly from 5 to 20 parts by mass, per 100 parts by mass of the fluororesin.

On the other hand, the inner layer (A) made of the above fluororesin having electrical conductivity, has a melt flowability such that the melt flow rate is from 14 to 30 (g/10 min).

With one having high melt flowability such that MFR of the inner layer (A) is from 14 to 30 (g/10 min), even when the hose is extrusion-molded at a high speed, the surface property of the hose, particularly the surface property of the inside surface of the inner layer (A) made of the fluororesin, will be maintained satisfactorily, and the surface state can always be maintained beautifully. The present inventors have found that this MFR value is very critical, and the surface state of the formed hose distinctly differs as between MFR (g/10 min) being less than 14, for example MFR being from 12 to 13, and MFR being 14.

More specifically, if MFR is less than 14 (g/10 min), when the withdrawing speed of the hose is from 10 to 15 (m/min), so-called melfra (melt fracture) will form, whereby the inside surface property of the inner layer deteriorates substantially, thus leading to a product having poor appearance. On the other hand, with respect to the upper limit, if MFR exceeds 30 (g/10 min), the strength (tensile strength at break) of the material itself decreases, and the strength as a hose decreases. Namely, when the adhesive strength of the outer and inner layers is measured, the adhesive strength decreases not by failure of the adhesive layer, but by the material failure of the inner layer.

Further, when the electrical conductivity-imparting filler is incorporated to ETFE, the MFR decreases. Accordingly, in order to secure the melt flowability of the inner layer within the above-mentioned range, it is preferred that MFR of ETFE before incorporation of the filler, is within a range of from 14 to 30 (g/10 min).

MFR is an index of the melt flowability of the resin and is also an index of the molecular weight. Usually, MFR of ETFE obtained by polymerization is less than 40 (g/10 min), and the molecular weight is large.

The inner layer (A) may be made to have a high melt flowability of from 14 to 30 (g/10 min), for example, by ① a method wherein, at the time of polymerizing ETFE, the type or the amount of the chain transfer agent is adjusted to obtain a polymer having a lower molecular weight than usual ETFE, or ② a method wherein ETFE (one having a MFR of less than 40 (g/10 min)) obtained by a usual polymerization method, is subjected to (i) irradiation with high energy rays, etc., (ii) heat treatment at a temperature of at least 300° C., preferably from 330 to 400° C., for from 5 to 30 minutes, or (iii) melt kneading together with a peroxide at a temperature higher than the decomposition temperature, to induce breakage of molecular chains by free radicals generated from the peroxide, thereby to lower the molecular weight (e.g. JP-A-11-320770).

Further, ETFE of the inner layer may be made to have a low molecular weight, in such a state that an electrical conductivity-imparting filler such as carbon black, or other additives may be blended thereto.

In the present invention, MFR is a value measured by the method stipulated in ASTM D-3159. Namely, it is represented by the amount of molten ETFE passed through a nozzle having a diameter of 2 mm and a length of 10 mm in 10 minutes at 297° C. and 49 N (g/10 min).

In the present invention, it is preferred that the inner layer (A) and the outer layer (B) are melt-bonded via a fluorinated adhesive resin layer having melt adhesiveness.

The following methods may be mentioned as a method for introducing adhesive functional groups of a fluorinated adhesive resin:

① a method of grafting a compound (hereinafter referred to as a grafting compound) having an adhesiveness-imparting functional group and a connecting group capable of grafting, to the fluororesin (JP-A-7-173230, JP-A-7-173446, JP-A-7-173447, JP-A-10-311461, etc.) and ② a method wherein at the time of polymerization of the fluororesin, at least one of copolymerizable monomers is made to have a functional group.

Here, the adhesiveness-imparting functional group is a group having reactivity or polarity and may, for example, be a carboxyl group, a residue after dehydration condensation of a carboxyl group (a carboxylic anhydride residue), an epoxy group, a hydroxyl group, an isocyanate group, an ester group, an amide group, an acid amide group, an aldehyde group, an amino group, a hydrolyzable silyl group or a cyano group.

① Grafting to the fluororesin may be carried out, for example, in the case of ETFE, by melt mixing ETFE, the grafting compound and a radical-forming agent at a temperature for generation of radicals, to graft the grafting compound to ETFE. Most preferred is a method wherein grafting is carried out while conducting melt kneading in a cylinder of an extrusion molding machine or an injection molding machine. The grafted ETFE may be made into molded material such as pellets. Further, as will be described in Examples given in hereinafter, the grafting in the molding machine such as an extrusion molding machine, is followed by, for example, three-layer extrusion of inner layer (A)/adhesive resin layer/outer layer (B), to obtain a molded product such as a hose of three-layer structure in one step.

The grafting compound is preferably a compound having (a) a connecting group selected from an organic group having an α, β-unsaturated double bond at a terminal, a peroxy group and an amino group, and (b) at least one adhesiveness-imparting functional group selected from a carboxyl group, a carboxylic anhydride residue, an epoxy group, a hydroxyl group, an isocyanate group, an ester group, an amide group, an acid amide group, an aldehyde group, an amino group, an hydrolyzable silyl group and a cyano group.

Among them, an unsaturated carboxylic acid, an epoxy group-containing unsaturated compound, a hydrolyzable silyl group-containing unsaturated compound or an epoxy group-containing peroxy compound is particularly preferred, and an unsaturated carboxylic anhydride is most preferred. The unsaturated carboxylic anhydride may, for example, be maleic anhydride or fumaric anhydride.

Further, the radical-forming agent is preferably one having a decomposition temperature within a range of from 120 to 350° C. and a half value period of about 1 minute. For example, it may be t-butyl hydroperoxide, benzoyl peroxide, dichlorobenzoyl peroxide, dicumyl peroxide or lauroyl peroxide.

Further, instead of grafting the grafting compound to the fluororesin, at the time of polymerization of a fluororesin from monomers, a monomer having the above-mentioned adhesiveness-imparting functional group may be used as at least one of the monomers.

② In the method wherein at the time of polymerization of ETFE, at least one of copolymerizable monomers is made to have a functional group, the following monomers may, for example, be mentioned as the functional group-containing monomer to be used.

(a) A perfluorovinyl ether monomer such as $R^1(OCFXCF_2)_mOCF=CF_2$ (wherein $R^1$ is a $C_{1-6}$ perfluoroalkyl group, X is a fluorine atom or a trifluoromethyl group, and m is an integer of from 1 to 6);

(b) a perfluorovinyl ether monomer having a group which can easily be converted to a carboxylic acid group or a sulfonic acid group, such as $CH_3OC(=O)CF_2CF_2CF_2OCF=CF_2$ or $FSO_2CF_2CF_2OCF(CF_3)CF_2OCF=CF_2$;

(c) a vinyl ester monomer such as vinyl acetate;

(d) a vinyl ether monomer such as ethyl vinyl ether, cyclohexyl vinyl ether or hydroxybutyl vinyl ether; and (e) an allyl ether monomer such as methyl allyl ether.

These monomers may be used alone or in combination as a mixture of two or more of them. A functional group may further be provided by a free radical. Further, as a polymerization initiator, a compound containing a functional group may be employed. Further, the polymerized fluororesin may be subjected to post treatment such as heat treatment, treatment with free radicals, acidic treatment or basic treatment, to provide new functional groups.

To the electrically conductive fluororesin layer as the inner layer (A), the outer layer (B) and the adhesive resin layer, constituting the fuel hose of the present invention, an optional component such as a thermoplastic resin, a filler such as silica, carbon, glass fibers or carbon fibers, a pigment, a plasticizer, a tackifier, a silane coupling agent, a titanate coupling gent, a flame retardant or a photostabilizer, may be incorporated. Further, to the electrically conductive fluororesin layer, other resin may be blended so long as the predetermined melt flowability can be maintained, and usual ETFE may be blended.

Further, it is also preferred to use, as a reinforcing agent for the inner layer (A), reinforcing fibers such as nylon fibers, polyester fibers, aramide fibers or carbon fibers, or the corresponding filaments. In a case where the melt adhesiveness is improved by the above-mentioned means such as ① irradiation with high energy rays, ② heat treatment or ③ breakage of molecular chains is induced by free radicals to lower the molecular weight, the tensile strength at break may sometimes decrease. If the tensile strength at break of the fluororesin is at most 21 MPa, the strength of the hose tends to be weak, such being undesirable. However, by using such reinforced fibers or the like as a filler, it is possible to secure a tensile strength at break at higher than 21 MPa required for the fluororesin as the inner layer.

The size of the fuel hose of the present invention is not particularly limited. However, the outer diameter is preferably within a range of from 5 to 30 mm, and the inner diameter is preferably within a range of from 3 to 25 mm. Further, the thickness of each layer constituting the fuel hose is not particularly limited, but it is preferably within a range of from 0.05 to 2.0 mm. For example, a case may be mentioned wherein the outer diameter is 8 mm, the inner diameter is 6 mm and a thickness of 1 mm (the inner layer: 0.2 mm, the outer layer: 0.8 mm). Further, in the case of using the melt adhesive resin layer, the thickness of the adhesive layer may be very thin, i.e. at a level of from about 0.001 to 0.1 mm thick.

As a method for forming the fuel hose having a laminated structure of the present invention, there may be mentioned a method wherein a cylindrical inner layer, an adhesive layer and an outer layer are separately formed by extruders, and the inner layer, the adhesive layer and the outer layer are laminated, followed by heat pressing, or a method wherein firstly, an inner tube is formed by an inner layer extruder, and on the outer circumference, an adhesive layer is extruded and formed, followed by forming an outer layer on the circumference by an outer layer extruder. However, it is most preferred to employ co-extrusion molding wherein a thermoplastic resin to form an outer layer, a melt adhesive resin and an electrically conductive fluororesin to form an inner layer, are subjected to co-extrusion molding in a molten state to have the two heat-fused (melt bonded) to form a hose having a three layer structure in one step.

Usually, it is preferred to preliminarily pelletize the respective resins for the outer and inner layers. For the co-extrusion molding, it is preferred that resin components are mechanically kneaded at a temperature where all resin components will be melted. As such a kneading apparatus, a high temperature kneader or a screw extruder may, for example, be employed. It is particularly preferred to employ a same directional twin screw extruder to mix the electroconductivity-imparting filler to a fluororesin uniformly.

Further, at the time of carrying out extrusion molding, it is possible to carry out grafting (melt-adhesiveness-imparting step) of a grafting compound to ETFE to form an adhesive resin layer in an extruder, followed by co-extrusion molding of inner and outer layers, so that grafting and co-extrusion molding can be carried out substantially simultaneously.

The fuel hose of the present invention may be one which has a corrugated region at a midpoint thereof. Such a corrugated region is a region where an optional region in a midpoint of the hose itself is formed into e.g. a waveform shape, a bellows shape, an accordion shape or a corrugated shape.

When the fuel hose of the present invention has such a region where a plurality of corrugated creases are formed in a ring shape, one side of the ring shape can be compressed, while the other side can be stretched outwardly, at such a region, whereby the hose can be easily bent at an optional angle without bringing about a stress fatigue or interlaminar peeling.

The method for forming the corrugated region is not particularly limited. However, it can easily be formed by firstly forming a straight tube, and then subjecting it to molding or the like to form a predetermined corrugated shape.

The fuel hose of the present invention is not limited to one having a corrugated region over the entire length of the hose, but may be one having a corrugated region partly.

In the present invention, various physical properties of the fuel hose (provided that with respect to the tensile strength at break, the physical properties of the resin for the inner layer itself) are measured as follows.

① Adhesive Strength (Melt Adhesive Strength):

As a test sample, one obtained by cutting a hose (laminated hose) in a length of 20 cm and further cutting it vertically, is used. From ends of the outer and inner layers, 1 cm is forcibly peeled, and the outer and inner layers are pinched by a small size tensilon as an instrument used, and one of them is pulled at a rate of 100 mm/min. The maximum strength is taken as the adhesive strength (N/cm).

In the present invention, the adhesive strength of the fuel hose is preferably at least 20 (N/cm).

② Electrical Conductivity:

Evaluated based on the results of measurement of the volume resistivity. As a test sample, an inner layer obtained by peeling at the time of measuring the adhesive strength in ①, is used. As a measuring instrument, Loresta AP, manufactured by Mitsubishi Chemical Corporation, or the like is employed, and four probes are brought in contact with the sample at 9.8 N, whereby the volume resistivity ($\Omega\cdot$cm) is measured.

In the present invention, the volume resistivity of the inner layer is preferably from about 1 to $10^9$ ($\Omega\cdot$cm).

③ Tensile Strength at Break:

No. 4' dumbbell formed of the fluororesin of the inner layer is used as a test specimen, and the measurement is carried out in accordance with ASTM D-638. Here, the tensile speed is 200 mm/min.

As described above, in the present invention, it is preferable that the tensile strength at break at the fluororesin constituting the inner layer, as measured in such a manner, is higher than 21 MPa. This is intended to secure the strength of the hose, so that the material failure of the inner layer will not occur before interlaminar peeling takes place in the hose having a laminated structure.

④ Appearance:

Not only the appearance of the thermoplastic resin of the outer layer but also the appearance of the inner layer as observed by cutting the laminated hose, is taken into consideration, and only when the appearance (the surface property) of both is good, it is regarded that a good laminated hose is formed.

The appearance is evaluated by visual observation, and symbol ○ indicates that the surface is smooth and presents a beautiful surface state, symbol × indicates a case where the surface is roughened, or melt fracture or weld lines are many, and symbol Δ indicates a case where such melt fracture or weld lines are partly observed. Practically, only ○ represents an acceptable product having a commercial value.

⑤ Surface Roughness:

The inside surface of the inner layer is measured by an electron surface roughness meter to obtain Rmax. It is desired that Rmax$\leq$100 $\mu$m, preferably Rmax$\leq$10 $\mu$m, more preferably Rmax$\leq$1.5.

Now, the present invention will be described in detail with reference to Preparation Examples and Working Examples. However, it should be understood that the present invention is by no means restricted by such specific Examples.

(1) Firstly, ETFE and its pellets, to form the inner layer of a hose, were prepared.

REFERENCE EXAMPLE 1

Resin A

By suspension polymerization, ETFE (polymerized units based on ethylene/polymerized units based on tetrafluoroethylene/polymerized units based on (perfluorobutyl)ethylene=58/40.5/1.5 (molar ratio), hereinafter referred to as resin A) was produced. MFR of resin A was measured and found to be 33 (g/10 min).

REFERENCE EXAMPLE 2

Resin B

By changing the charging ratio of a chain transfer agent, in the same manner as in Reference Example 1, ETFE (polymerized units based on ethylene/polymerized units based on tetrafluoroethylene/polymerized units based on (perfluorobutyl)ethylene=58/37.8/4.2 (molar ratio), hereinafter referred to as resin B) was produced. MFR of resin B was measured and found to be 120 (g/10 min).

REFERENCE EXAMPLE 3
Pellets 1 (Electrically Conductive ETFE 1)

100 Parts by mass of resin A prepared in Reference Example 1 and 11 parts by mass of carbon black (manufactured by Denki Kagaku Kogyo K.K.), were supplied to a same directional twin screw extruder and kneaded by adjusting the melting zone temperature of cylinder to 300° C. The discharged strand was cooled with water, and the strand was cut by a pelletizer to obtain pellets 1. The pellets 1 were dried for 10 hours in an electric oven of 120° C. to remove the water content.

MFR of pellets 1 was measured and found to be 4.7 (g/10 min). Further, pellets 1 were compression-molded under 10 MPa at 280° C. to obtain a sheet of 1 mm in thickness. From this sheet, a dumbbell for tensile break strength test (ASTM D-638 No. 4') was punched out and subjected to a tensile break strength test at 200 (mm/min). As a result, the tensile strength at break was 30 MPa.

REFERENCE EXAMPLE 4
Pellets 2 (Highly Melt Flowable Conductive ETFE 2)

100 Parts by mass of resin B prepared in Reference Example 2 and 11 parts by mass of carbon black (manufactured by Denki Kagaku Kogyo K.K.), were supplied to a same directional twin screw extruder and kneaded by adjusting the melting zone of the cylinder to 300° C., to obtain pellets 2. The pellets 2 were dried for 10 hours in an electric oven of 120° C. to remove the water content.

MFR of pellets 2 was measured and found to be 14 (g/10 min). Further, pellets 2 were compression-molded under 10 MPa at 280° C. to obtain a sheet of 1 mm in thickness. From this sheet, a dumbbell for tensile break strength test (ASTM D-638 No. 4') was punched out and subjected to a tensile break strength test at 200 (mm/min). As a result, the tensile strength at break was 29 MPa.

REFERENCE EXAMPLE 5
Pellets 3 (Highly Melt Flowable Conductive ETFE 3)

100 Parts by mass of resin A prepared in Reference Example 1, 0.2 part by mass of t-butyl hydroperoxide and 11 parts by mass of carbon black (manufactured by Denki Kagaku Kogyo K.K.), were supplied to a same directional twin screw extruder and kneaded by adjusting the melting zone temperature of cylinder to 300° C. to obtain pellets 3. The pellets 3 were dried for 10 hours in an electric oven of 120° C. to remove the water content.

MFR of pellets 3 was measured and found to be 17 (g/10 min). Further, pellets 3 were compression-molded under 10 MPa at 280° C. to obtain a sheet of 1 mm in thickness. From this sheet, a dumbbell for tensile break strength test (ASTM D-638 No. 4') was punched out and subjected to a tensile break strength test at 200 (mm/min). As a result, the tensile strength at break was 17 MPa.

REFERENCE EXAMPLE 6
Pellets 4 (Highly Melt Flowable Conductive ETFE 4)

100 Parts by mass of resin B prepared in Reference Example 2, 0.2 part by mass of t-butyl hydroperoxide and 11 parts by mass of carbon black (manufactured by Denki Kagaku Kogyo K.K.), were supplied to a same directional twin screw extruder and kneaded by adjusting the melting zone temperature of cylinder to 300° C., to obtain pellets 4. The pellets 4 were dried for 10 hours in an electric oven of 120° C. to remove the water content.

MFR of pellets 4 was measured and found to be 28 (g/10 min). Further, pellets 4 were compression-molded under 10 MPa at 280° C. to obtain a sheet of 1 mm in thickness. From this sheet, a dumbbell for tensile break strength test (ASTM D-638 No. 4') was punched out and subjected to a tensile break strength test at 200 (mm/min). As a result, the tensile strength at break was 23 MPa.

REFERENCE EXAMPLE 7
Resin J

By changing the charging amount of the chain transfer agent, ETFE (polymerized units based on ethylene/polymerized units based on tetrafluoroethylene/polymerized units based on (perfluorobutyl)ethylene=58/39.0/3.0 (molar ratio), hereinafter referred to as resin J) was prepared in the same manner as Reference Example 1. MFR of resin J was measured and found to be 95 (g/10 min).

REFERENCE EXAMPLE 8
Pellets 5 (Electrically Conductive ETFE 5)

100 Parts by mass of resin J prepared in Reference Example 7 and 11 parts by mass of carbon black (manufactured by Denki Kagaku Kogyo K.K.), were supplied to a same directional twin screw extruder and kneaded by adjusting the melting zone temperature of cylinder to 300° C. The discharged strand was cooled with water, and the strand was cut by a pelletizer to obtain pellets 5. The pellets 5 were dried for 10 hours in an electric oven of 120° C. to remove the water content.

MFR of pellets 5 was measured and found to be 12 (g/10 min). Further, pellets 5 were compression-molded under 10 MPa at 280° C. to obtain a sheet of 1 mm in thickness. From this sheet, a dumbbell for tensile break strength test (ASTM D-638 No. 4') was punched out and subjected to a tensile break strength test at 200 (mm/min). As a result, the tensile strength at break was 30 MPa.

REFERENCE EXAMPLE 9
Resin K

By changing the charging amount of the chain transfer agent, ETFE (polymerized units based on ethylene/polymerized units based on tetrafluoroethylene/polymerized units based on (perfluorobutyl)ethylene=58/36.5/5.5 (molar ratio), hereinafter referred to as resin K) was prepared in the same manner as Reference Example 1. MFR of resin K was measured and found to be 183 (g/10 min).

REFERENCE EXAMPLE 10
Pellets 6 (Highly Melt Flowable Conductive ETFE 6)

100 Parts by mass of resin K prepared in Reference Example 9, 0.2 part by mass of t-butyl hydroperoxide and 11 parts by mass of carbon black (manufactured by Denki Kagaku Kogyo K.K.), were supplied to a same directional twin screw extruder and kneaded by adjusting the melting zone temperature of cylinder to 300° C., to obtain pellets 6. The pellets 6 were dried for 10 hours in an electric oven of 120° C. to remove the water content.

MFR of pellets 6 was measured and found to be 43 (g/10 min). Further, pellets 6 were compression-molded under 10 MPa at 280° C. to obtain a sheet of 1 mm in thickness. From this sheet, a dumbbell for tensile break strength test (ASTM D-638 No. 4') was punched out and subjected to a tensile break strength test at 200 (mm/min). As a result, the tensile strength at break was 15 MPa.

(2) In the following Examples 1 to 6 and Comparative Examples 1 and 5, hoses were formed by using the above resins or pellets.

EXAMPLE 1

To a cylinder to form an outer layer of a hose, polyamide 12 (5016XHP, manufactured by Toray Corporation) was supplied.

To a cylinder to form an adhesive resin layer, a mixture comprising 100 parts by mass of a powder of resin A, 1.5 parts by mass of maleic anhydride and 0.2 part by mass of t-butyl hydroperoxide, was supplied, to form melt adhesive fluororesin C at a melting zone temperature of cylinder of 260° C. for a retention time of 3 minutes, and the fluororesin C was transferred to a transport zone of the cylinder.

To a cylinder to form an inner layer, pellets 2 of highly melt flowable conductive ETFE (MFR=14 (g/10 min)) were supplied, to form resin D at a temperature of the melting zone temperature of cylinder of 300° C. for a retention time of three minutes, and resin D was transferred to a transport zone of the cylinder.

A laminated hose having an outer diameter of 8 mm and an inner diameter of 6 mm was formed by three layer co-extrusion at a co-extrusion die temperature of 250° C. for polyamide 12, resin C and resin D at a withdrawing speed of 15 (m/min). The appearance of the obtained laminated hose was visually observed, whereby the surface property of both the outer and inner layers, was good. The surface roughness Rmax of the inside surface of the inner layer was 1.0 μm.

The adhesive strength (melt adhesive strength) of the outer and inner layers was measured and found to be 56 N/cm. After immersing the laminated hose in a fuel oil for 120 hours at 60° C., the adhesive strength of the outer and inner layers was measured and found to be 55 N/cm. Further, the volume resistivity of the inner layer was measured and found to be $10^3$ (Ω·cm)

Further, the tensile strength at break of resin D of the inner layer was 29 MPa.

The results are summarized in Table 1.

EXAMPLE 2

The same experiment as in Example 1 was carried out except that a laminated hose having an outer diameter of 8 mm and an inner diameter of 6 mm was formed by three layer co-extrusion by increasing the withdrawing speed to 20 (m/min).

The appearance of the laminated hose was visually observed, whereby the surface property of both the outer and inner layers, was good. The surface roughness Rmax of the inside surface of the inner layer was 1.2 μm.

Further, the adhesive strength (melt adhesive strength) of the outer and inner layers was measured and found to be 54 N/cm. After immersing the laminated hose in a fuel oil for 120 hours at 60° C., the adhesive strength of the outer and inner layers was measured and found to be 53 N/cm. Further, the volume resistivity of the inner layer was measured and found to be $10^3$ (Ω·cm).

Further, the tensile strength at break of resin D of the inner layer was 29 MPa.

The results are summarized in Table 1.

EXAMPLE 3

To a cylinder to form an outer layer of a hose, polyamide 12 (5016XHP, manufactured by Toray Corporation) was supplied.

To a cylinder to form an adhesive resin layer, in the same manner as in Example 1, a mixture comprising 100 parts by mass of a powder of resin A, 1.5 parts by mass of maleic anhydride and 0.2 part by mass of t-butyl hydroperoxide, was supplied, to form melt adhesive fluororesin C at a melting zone temperature of cylinder of 260° C. for a retention time of 3 minutes, and the fluororesin C was transferred to a transport zone of the cylinder.

To a cylinder to form an inner layer, pellets 3 of highly melt flowable conductive ETFE (MFR=17 (g/10 min)) were supplied.

A laminated hose having an outer diameter of 8 mm and an inner diameter of 6 mm was formed by three layer co-extrusion at a co-extrusion die temperature of 250° C. for polyamide 12, resin C and pellets 3 at a withdrawing speed of 15 (m/min). The appearance of the obtained laminated hose was visually observed, whereby the surface property of both the outer and inner layers, was good. The surface roughness Rmax of the inside surface of the inner layer was 0.8 μm.

Further, the adhesive strength (melt adhesive strength) of the outer and inner layers was measured and found to be 68 N/cm. After immersing the laminated hose in a fuel oil for 120 hours at 60° C., the adhesive strength of the outer and inner layers was measured and found to be 67 N/cm. Further, the volume resistivity of the inner layer was measured and found to be $10^3$ (Ω·cm)

Further, the tensile strength at break of the inner layer was 25 MPa.

The results are summarized in Table 1.

EXAMPLE 4

The same experiment as in Example 3 was carried out except that a laminated hose having an outer diameter of 8 mm and an inner diameter of 6 mm was formed by three layer co-extrusion by increasing the withdrawing speed to 20 (m/min).

The outer appearance of the obtained laminated hose was visually observed, whereby the surface property of both the outer and inner layers, was good. The surface roughness Rmax of the inside surface of the inner layer was 0.8 μm.

Further, the adhesive strength (melt adhesive strength) of the outer and inner layers was measured and found to be 62 N/cm. After immersing the laminated hose in a fuel oil for 120 hours at 60° C., the adhesive strength of the outer and inner layers was measured and found to be 61 N/cm. Further, the volume resistivity of the inner layer was measured and found to be $10^3$ (Ω·cm).

Further, the tensile strength at break of the inner layer was 25 MPa.

The results are summarized in Table 1.

EXAMPLE 5

To a cylinder to form an outer layer of a hose, polyamide 12 (5016XHP, manufactured by Toray Corporation) was supplied.

To a cylinder to form an adhesive resin layer, in the same manner as in Example 1, a mixture comprising 100 parts by mass of a powder of resin A, 1.5 parts by mass of maleic anhydride and 0.2 part by mass of t-butyl hydroperoxide, was supplied, to form fluororesin C at a melting zone temperature of cylinder of 260° C. for a retention time of 3 minutes, and the fluororesin C was transferred to a transport zone of the cylinder.

To a cylinder to form an inner layer, pellets 4 of highly melt flowable conductive ETFE (MFR=28 (g/10 min)) were supplied.

A laminated hose having an outer diameter of 8 mm and an inner diameter of 6 mm was formed by three layer co-extrusion at a co-extrusion die temperature of 250° C. for polyamide 12, resin C and pellets 4 at a withdrawing speed of 20 (m/min). The appearance of the obtained laminated hose was visually observed, whereby the surface property of both the outer and inner layers, was very good. The surface roughness Rmax of the inside surface of the inner layer was 0.8 μm.

Further, the adhesive strength (melt adhesive strength) of the outer and inner layers was measured and found to be 71 N/cm. After immersing the laminated hose in a fuel oil for 120 hours at 60° C., the adhesive strength of the outer and inner layers was measured and found to be 70 N/cm. Further, the volume resistivity of the inner layer was measured and found to be $10^3$ (Ω·cm).

Further, the tensile strength at break of the resin of the inner layer was 23 MPa.

The results are summarized in Table 1.

COMPARATIVE EXAMPLE 1

To a cylinder to form an outer layer of a hose, polyamide 12 (5016XHP, manufactured by Toray Corporation) was supplied.

To a cylinder to form an adhesive resin layer, a mixture comprising 100 parts by mass of a powder of resin A, 1.5 parts by mass of maleic anhydride and 0.2 part by mass of t-butyl hydroperoxide, was supplied, to form resin C at a melting zone temperature of cylinder of 260° C. for a retention time of 3 minutes, and resin C was transferred to a transport zone of the cylinder.

To a cylinder to form an inner layer, electrically conductive pellet 1 prepared in Reference Example 3 (MFR=4.7 (g/10 min)) were supplied.

A laminated hose having an outer diameter of 8 mm and an inner diameter of 6 mm was formed by three layer co-extrusion at a co-extrusion die temperature of 250° C. for polyamide 12, resin C and pellets 1 at a withdrawing speed of 15 (m/min). The appearance of the obtained laminated hose was visually observed, whereby the inner layer was found to be roughened. The surface roughness Rmax of the inside surface of the inner layer was 151 μm.

The results are summarized in Table 1.

COMPARATIVE EXAMPLE 2

The same experiment as in Comparative Example 1 was carried out except that a laminated hose having an outer diameter of 8 mm and an inner diameter of 6 mm was formed by three layer co-extrusion by lowering the withdrawing speed to 10 (m/min).

The appearance of the obtained laminated hose was visually observed, whereby the inner layer was found to be roughened as in Comparative Example 1, and no substantial improvement of the surface property was observed.

The surface roughness Rmax of the inner layer was 124 μm.

The results are summarized in Table 1.

COMPARATIVE EXAMPLE 3

To a cylinder to form an outer layer of a hose, polyamide 12 (5016XHP, manufactured by Toray Corporation) was supplied.

To a cylinder to form an adhesive resin layer, a mixture comprising 100 parts by mass of a powder of resin A, 1.5 parts by mass of maleic anhydride and 0.2 part by mass of t-butyl hydroperoxide, was supplied, to form resin C at a melting zone temperature of cylinder of 260° C. for a retention time of 3 minutes, and resin C was transferred to a transport zone of the cylinder.

To a cylinder to form an inner layer, electrically conductive pellets 5 prepared in Reference Example 8 (MFR=12 (g/10 min)) were supplied.

A laminated hose having an outer diameter of 8 mm and an inner diameter of 6 mm was formed by three layer co-extrusion at a co-extrusion die temperature of 250° C. for polyamide 12, resin C and pellets 5 at a withdrawing speed of 15 (m/min). The appearance of the obtained laminated hose was visually observed, whereby the inner layer was found to be roughened. The surface roughness Rmax of the inside surface of the inner layer was 114 μm.

The results are summarized in Table 1.

COMPARATIVE EXAMPLE 4

The same experiment as in Comparative Example 1 was carried out except that a laminated hose having an outer diameter of 8 mm and an inner diameter of 6 mm was formed by three layer co-extrusion by lowering the withdrawing speed to 10 (m/min).

The appearance of the obtained laminated hose was visually observed, whereby the inner layer was found to be roughened as in Comparative Example 1, and no substantial improvement of the surface property was observed.

The surface roughness Rmax of the inside surface of the inner layer was 102 μm.

The results are summarized in Table 1.

COMPARATIVE EXAMPLE 5

To a cylinder to form an outer layer of a hose, polyamide 12 (5016XHP, manufactured by Toray Corporation) was supplied.

To a cylinder to form an adhesive resin layer, in the same manner as in Example 1, a mixture comprising 100 parts by mass of a powder of resin A, 1.5 parts by mass of maleic anhydride and 0.2 part by mass of t-butyl hydroperoxide, was supplied, to form melt adhesive fluororesin C at a melting zone temperature of cylinder of 260° C. for a retention time of 3 minutes, and fluororesin C was transferred to a transport zone of the cylinder.

To a cylinder to form an inner layer, pellets 6 of highly melt flowable conductive ETFE (MFR=43 (g/10 min)) were supplied.

A laminated hose having an outer diameter of 8 mm and an inner diameter of 6 mm was formed by three layer co-extrusion at a co-extrusion die temperature of 250° C. for polyamide 12, resin C and pellets 6 at a withdrawing speed of 20 (m/min). The appearance of the obtained laminated hose was visually observed, whereby the surface property of both the outer and inner layers was very good. The surface roughness Rmax of the inside surface of the inner layer was 0.8 μm.

When it was attempted to measure the adhesive strength (melt adhesive strength) of the outer and inner layers, the inner layer underwent material fracture, and the measurement was impossible.

Further, the tensile strength at break of the inner layer was 15 MPa.

The results are summarized in Table 1.

TABLE 1

| | Inner layer MFR g/10 min | Withdraw speed m/min | Adhesive strength N/cm | Tensile break strength MPa | Surface roughness Rmax | Appearance |
|---|---|---|---|---|---|---|
| Comp. Ex. 1 | 4.7 | 15 | — | 30 | 150 | Melt fracture |
| Comp. Ex. 2 | 4.7 | 10 | — | 30 | 124 | Melt fracture |
| Comp. Ex. 3 | 12 | 15 | — | 30 | 114 | Melt fracture |
| Comp. Ex. 4 | 12 | 10 | — | 30 | 102 | Δ |
| Ex. 1 | 14 | 15 | 56 | 29 | 1.0 | ○ |
| Ex. 2 | 14 | 20 | 54 | 29 | 1.2 | ○ |
| Ex. 3 | 17 | 15 | 68 | 25 | 0.8 | ○ |
| Ex. 4 | 17 | 20 | 62 | 25 | 0.8 | ○ |
| Ex. 5 | 28 | 20 | 71 | 23 | 0.8 | ○ |
| Comp. Ex. 5 | 43 | 20 | — | 15 | 0.8 | ○ |

EXAMPLE 6

Using five laminated hoses which were the same as in Examples 1 to 5, five hoses having corrugated regions over the entire hoses, were prepared by a molding method.

Each of these hoses was a corrugated laminated hose having an outer diameter of 11 mm and an inner diameter of 9.4 mm at thick portions of the corrugated region and an outer diameter of 8 mm and an inner diameter of 6 mm at thin portions. With respect to these corrugated laminated hoses, the adhesive strength of the outer and inner layers, and the surface roughness Rmax of the inside surface of the inner layer, were confirmed to be the same as of the laminated hoses of Examples 1 to 5. Further, these corrugated laminated hoses can be mounted as bent at an optional angle depending upon the structural configuration in an engine room.

INDUSTRIAL APPLICABILITY

The present invention provides a fuel hose having a laminated structure comprising an outer layer made of a thermoplastic resin and an inner layer made of a fluororesin having electrical conductivity, wherein a highly melt flowable fluororesin having a MFR of from 14 to 30 (g/10 min) is used as the inner layer, whereby it is possible to obtain a fuel hose having a high interlaminar adhesive strength, whereby the surface smoothness is secured even when molded at a high speed.

Further, the fuel hose of the present invention preferably has a corrugated region and can be mounted as bent at an optional angle depending upon the structural configuration in an engine room without necessity of bend processing and without stress fatigue or interlaminar peeling. Further, even when a corrugated region is formed, the interlaminar adhesive strength and the surface smoothness will not be impaired.

The entire disclosure of Japanese Patent Application No. 11-277822 filed on Sep. 30, 1999 including specification, claims and summary are incorporated herein by reference in its entirety.

What is claimed is:

1. A fuel hose having a laminated structure, comprising:
   an inner layer (A) comprising a fluororesin; and
   an outer layer (B) comprising a thermoplastic resin other than a fluororesin;
   wherein said inner layer (A) has an electrical conductivity and a melt flowability such that a melt flow rate is from 14 to 30 (g/10 min); and
   wherein at least an inside surface of said inner layer is substantially smooth;
   wherein a surface roughness Rmax of said inside surface of the inner layer is at most 100 μm.

2. The fuel hose according to claim 1, which has a corrugated region at a midpoint thereof.

3. The fuel hose according to claim 1, wherein a tensile strength at break of the inner layer is higher than 21 MPa.

4. The fuel hose according to claim 1, wherein a volume resistivity of the inner layer is from 1 to $10^9$ (Ω·cm).

5. The fuel hose according to claim 1, wherein the inner layer comprises an electrical conductivity-imparting agent.

6. The fuel hose according to claim 5, wherein said electrical conductivity-imparting agent is carbon black.

7. The fuel hose according to claim 1, wherein said fluororesin of the inner layer is an ethylene/tetrafluoroethylene copolymer.

8. The fuel hose according to claim 7, wherein the ethylene/tetrafluoroethylene copolymer is a copolymer of 60–30 molar percent of ethylene, 20–60 molar percent of tetrafluoroethylene, and 0–40 molar percent of other copolymerizable monomer.

9. The fuel hose according to claim 8, wherein the other copolymerizable monomer is present and is α-olefin.

10. The fuel hose according to claim 8, wherein the other copolymerizable monomer is present and is a fluoroolefin.

11. The fuel hose according to claim 8, wherein the other copolyermizable monomer is present and is a vinyl ether.

12. The fuel hose according to claim 8, wherein the other copolymerizable monomer is present and is a (meth) acrylate.

13. The fuel hose according to claim 1, wherein said thermoplastic resin of the outer layer is polyamide 6, polyamide 11 or polyamide 12.

14. The fuel hose according to claim 1, wherein the inner layer and the outer layer are melt-bonded via a melt adhesive fluorinated adhesive resin layer.

15. The fuel hose according to claim 1, wherein the inner layer and the outer layer are formed by co-extrusion molding.

16. The fuel hose according to claim 1, having an outer diameter of from 5 to 30 mm, and an inner diameter of from 3 to 25 mm.

17. The fuel hose according to claim 1, having a corrugated region at a midpoint thereof.

18. The fuel hose according to claim 1, having a corrugated region over the entire length of the hose.

19. The fuel hose according to claim 1, having an adhesive strength of at least 20 (N/cm).

20. A method of piping fuel, which comprises piping said fuel through the fuel hose of claim 1.

21. The method of claim 20, wherein said fuel is gasoline comprising alcohol or an aromatic compound.

22. The fuel hose according to claim 1, which is obtained by molding at a withdrawing speed of at least 15 m/min.

23. The fuel hose according to claim 22, which does not exhibit melt facture as detected by visual observation.

24. A fuel hose having a laminated structure, comprising:

an inner layer (A) comprising a fluororesin; and an outer layer (B) comprising a thermoplastic resin other than a fluororesin;

wherein said inner layer (A) has an electrical conductivity and a melt flowability such that a melt flow rate is from 14 to 30 (g/10 min); and wherein at least an inside surface of said inner layer is substantially smooth;

wherein said fluororesin of the inner layer is an ethylene/tetrafluoroethylene copolymer which is a copolymer of 60–30 molar percent of ethylene, 20–60 molar percent of tetrafluoroethylene, and 0–40 molar percent of other copolymerizable monomer;

wherein the other copolymerizable monomer is present; and wherein said other copolymerizable monomer is selected from the group consisting of an α-olefin, a fluoroolefin, a vinyl ether and a (meth)acrylate.

* * * * *